United States Patent
Martin et al.

(10) Patent No.: US 10,630,338 B2
(45) Date of Patent: Apr. 21, 2020

(54) METHOD FOR TRANSMITTING ADDITIONAL INFORMATION ON TRANSMISSION SIGNALS WITH SPECTRUM SPREADING AND ASSOCIATED SYSTEM

(71) Applicant: THALES, Courbevoie (FR)

(72) Inventors: Pauline Martin, Toulouse (FR); Thibaud Calmettes, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/119,643

(22) Filed: Aug. 31, 2018

(65) Prior Publication Data
US 2019/0097676 A1 Mar. 28, 2019

(30) Foreign Application Priority Data
Sep. 26, 2017 (FR) .................................... 17 00985

(51) Int. Cl.
*H04B 1/00* (2006.01)
*H04B 1/7097* (2011.01)
*H04B 1/707* (2011.01)

(52) U.S. Cl.
CPC ........... *H04B 1/7097* (2013.01); *H04B 1/707* (2013.01)

(58) Field of Classification Search
CPC .............................. H04B 1/7097; H04B 1/707

USPC .......................................... 375/130, 146, 140
See application file for complete search history.

(56) References Cited

U.S. PATENT DOCUMENTS

| | | | | |
|---|---|---|---|---|
| 5,231,646 A * | 7/1993 | Heath | .................... | H04B 1/707 375/130 |
| 5,815,526 A * | 9/1998 | Rice | ....................... | H04B 1/707 370/479 |
| 8,391,490 B2 | 3/2013 | Damidaux | | |
| 9,112,571 B1 * | 8/2015 | Raimondi | ............ | H04B 1/1081 |
| 2003/0067961 A1 * | 4/2003 | Hudson | ................ | H04B 1/7103 375/130 |
| 2004/0052301 A1 * | 3/2004 | Horne | .................... | H04B 1/707 375/146 |
| 2005/0129094 A1 * | 6/2005 | Trutna, Jr. | ............ | H04J 14/005 375/146 |
| 2007/0237247 A1 * | 10/2007 | Schaepperle | ......... | H04L 5/0032 375/260 |
| 2017/0033843 A1 * | 2/2017 | Wang | ...................... | H04W 4/70 |

FOREIGN PATENT DOCUMENTS

| | | |
|---|---|---|
| EP | 2 188 943 A1 | 5/2010 |
| WO | 2009/037133 A1 | 3/2009 |

* cited by examiner

*Primary Examiner* — Tesfaldet Bocure
(74) *Attorney, Agent, or Firm* — Baker & Hostetler LLP

(57) ABSTRACT

A method is provided for transmitting additional information on communication or navigation signals with spectrum spreading, the additional information being coded by a value of intentional quantized degradation of the correlation of the spreading code, the degradation being coded on the spreading code by modifying at least one chip.

7 Claims, 2 Drawing Sheets

METHOD FOR TRANSMITTING ADDITIONAL INFORMATION ON TRANSMISSION SIGNALS WITH SPECTRUM SPREADING AND ASSOCIATED SYSTEM

CROSS-REFERENCE TO RELATED APPLICATIONS

This application claims priority to foreign French patent application No. FR 1700985, filed on Sep. 26, 2017, the disclosure of which is incorporated by reference in its entirety.

FIELD OF THE INVENTION

The invention pertains to a method for transmitting additional information on transmission signals with spectrum spreading and an associated system.

BACKGROUND

The code sequences used during transmissions of signals with spectrum spreading are composed of a series of pulses called "chips" so as to be distinguished from the "bits" of which a data sequence is composed.

The field of the invention is that of the creation of supplementary information on a transmission of spread-spectrum signals. This may in particular prove to be useful when an already totally defined channel is available, on which it is desired to add some information, for example in the context of an emergency locating radiobeacon alert and locating system, such as Cospas/Sarsat, or within the framework of the navigation signal of a GNSS satellite. Although the issue may be applicable to a navigation signals context, it is above all of interest in a communication context.

To add information encoded on a spread-spectrum signal, the simplest solution consists in slicing the code into several code subsets and in adding binary content on portions of the sliced code by replacing the chips with their complement or otherwise. This amounts to using the techniques of TMBOC type not on the basis of a purely pilot channel to create data, but to create data on data. This approach has the defect of being deterministic (the position of the modified portion of code and the number of modified chips must be predefined in advance), and of therefore being poorly adaptable to the reception context, without establishing a user-based slicing that is very hefty in terms of costs (consumption of the band and interrogation logic). Furthermore, it requires a modification of the despreading correlators so as to be able to manage this slicing, and may therefore require considerable changing of the receivers, in particular in the most usual case where the despreading is carried out by an integrated component. Finally, this technique is not very discreet since it will be fairly simple to observe the temporal degradation of the code per chip packet, simply for example by taking an average over several successive codes, and this may be cumbersome in certain contexts.

Also known is a method called "Watermarking" in English, described for example in European patent EP 2188943 B1 (Thales) or American patent U.S. Pat. No. 8,391,490 B2 (Thales), and which consists in inserting supplementary information at fixed and known positions inside the various navigation signal spreading codes. A degradation is introduced into the reception of the signal, but the amplitude of this degradation is fixed and of known position. This solution has in particular the drawbacks of requiring a modification of the receiver so as to adapt it to the extraction of this information. This therefore limits it to post-processing functions, and it is therefore limited to processes of signal authentication by dedicated centralized reception chains, and not by the user receiver itself. Moreover, it may be rendered discernable by the repetitivity of the modified chip block.

SUMMARY OF THE INVENTION

An aim of the invention is to alleviate the problems cited above, and in particular to allow an implementation which is independent of the receiver correlation layer, which does not require any modification of the latter.

There is proposed, according to one aspect of the invention, a method for transmitting variable additional information on communication or navigation signals with spectrum spreading, the additional information being coded by a variation of a quantized intentional degradation of the correlation of the spreading code, the degradation being coded on the spreading code by modifying at least one chip.

Such a method makes it possible to add information on communication or navigation signals with spectrum spreading in a flexible manner (according to the envisaged rate of good demodulation on these added information items and according to the degradation tolerated on the initial signal), without modifying the correlation stage for the receiver, and in a manner which is possibly discreet and non-deterministic as in the prior art cited above.

In one mode of implementation, the spreading code comprising N chips and a degradation tolerance being equal to x dB, it is possible to modify up to K chips out of each series of N chips, each series coding a symbol, and to transmit $2^K$ values of additional information, with $K=\frac{1}{2}N(1-10^{-(x/10)})$.

Thus, it is possible to code a significant amount of information, while being less detectable than in the prior art and non-deterministic, without modifying the correlation stage of the receiver.

According to one mode of implementation, a correlation degradation is repeated several times in succession.

It is thus possible to achieve a lower probability of added-information demodulation error than the probability of supplementary-information estimation error on a single occurrence of the spreading code.

In one mode of implementation, one and the same amount of correlation degradation (the added information) is repeated several times in succession by identical coding on the spreading code.

The fact of always modifying the same chips to code the same item of information is beneficial in facilitating the demodulation, by increasing the probability of detection and of good demodulation of the degradation.

As a variant, the same amount of correlation degradation (the added information) is repeated several times in succession but by at least two different ways of coding on the spreading code.

By using several codings to code the same amount of degradation (out of the $2^K$ possibilities of degradation of the code, several of them are used for the same degradation) in the repetition of degradation of the correlation, the demodulation is less convenient, but if the channel has a defect, then the same item of information is not lost each time, and this is less detectable than the repetition of the degradation by identical coding on the spreading code.

In one embodiment, at least one degradation value is prohibited from among the $2^K$ possible values.

Thus, it is possible to produce degradation tiers, thereby facilitating demodulation.

According to one mode of implementation, the transmission of information items is performed in an intermingled manner on a plurality of communication channels, and the corresponding degradations of correlation are applied on the various communication channels.

Thus, good reception of the supplementary information item is obtained even if a particular channel is attenuated (for any reason other than the intentional degradation).

In one mode of implementation, the various correlation degradations are applied at different instants on different channels.

Thus, the addition of independent supplementary information items, which may moreover have different rates of good detection and therefore be suitable for different signal-to-noise ratios, is multiplexed.

According to one mode of implementation, the correlation degradations are applied on two channels, a pilot channel and a data channel.

According to another aspect of the invention, there is also proposed a system for transmitting additional information on communication or navigation signals with spectrum spreading, configured to implement the method such as described above.

BRIEF DESCRIPTION OF THE DRAWINGS

The invention will be better understood on studying a few embodiments described by way of wholly non-limiting examples and illustrated by the drawings which illustrate a mode of implementation of the method according to one aspect of the invention.

DETAILED DESCRIPTION

Figure 1A:
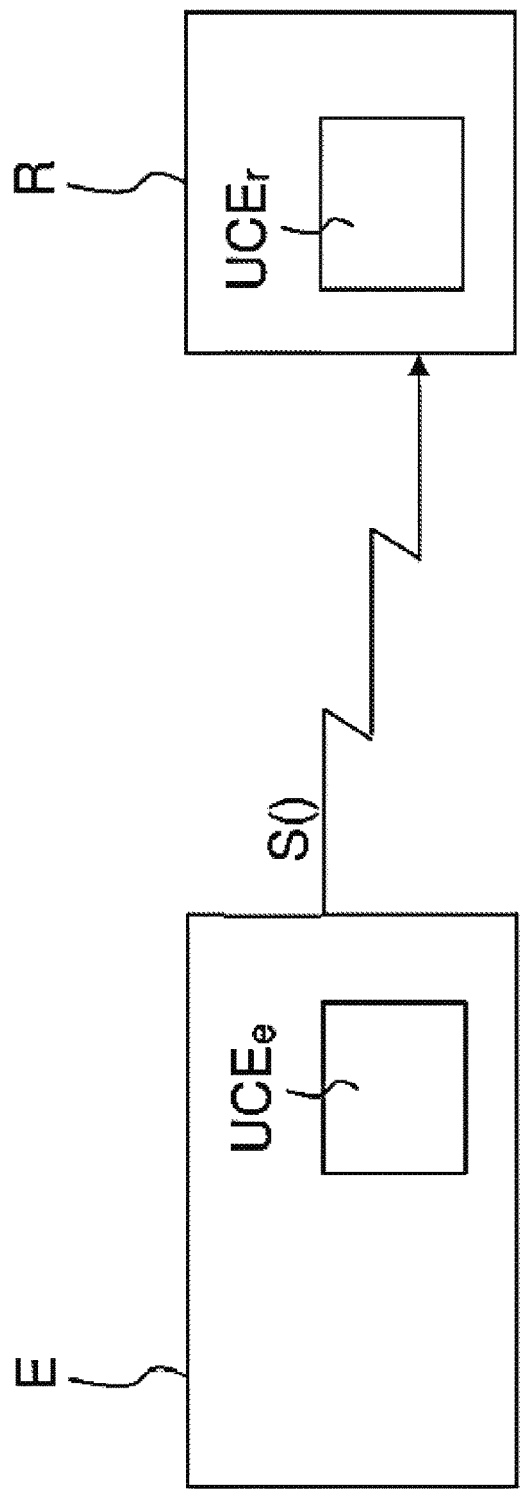
FIG. 1A schematically represents a conventional system and FIG. 1B schematically represents the conventional system in which the method of the invention is implemented.
Figure 1B:
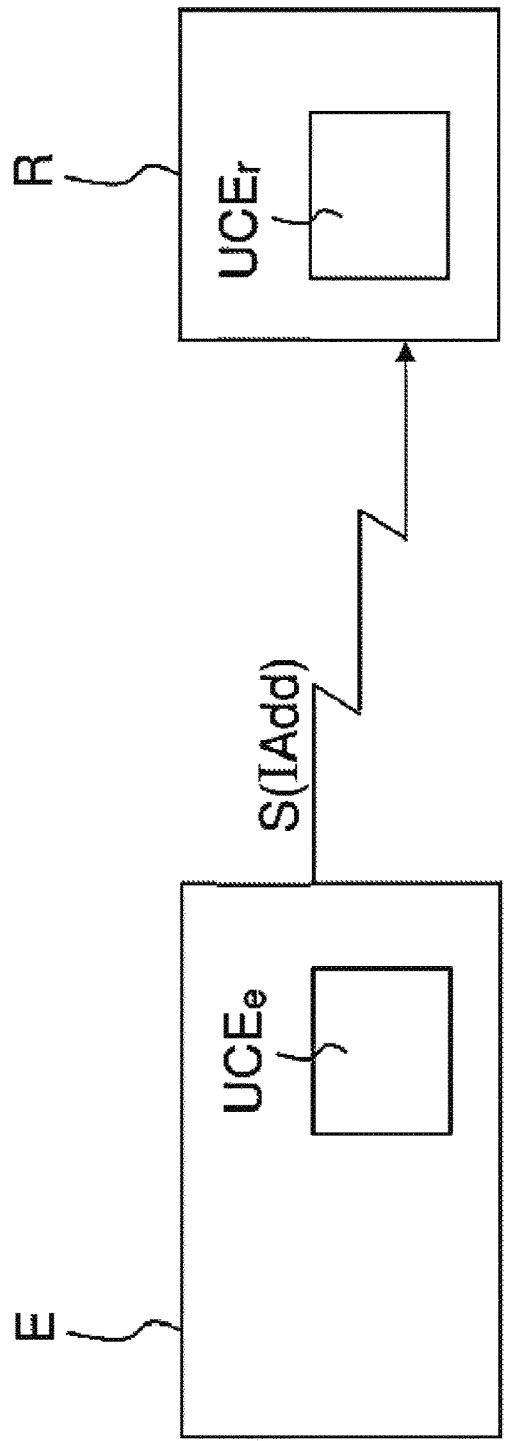
Figure 2:
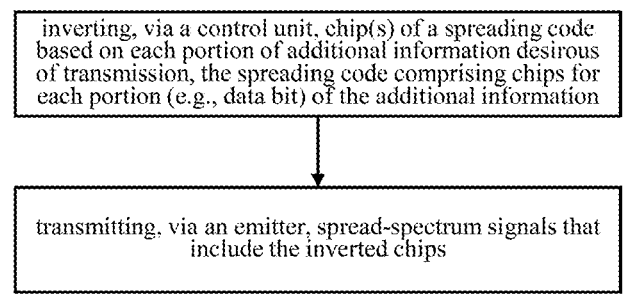
FIG. 2 illustrates a process for transmitting variable additional information, in accordance with one or more embodiments.

As illustrated in FIG. 1A, the disclosed system comprises an emitter E furnished with an electronic control unit UCEe and a receiver R furnished with an electronic control unit UCEr. The electronic control units of FIG. 1B, which comprise the conventional components, are capable, when modified according to a herein-disclosed process, of performing the invented processing of communication or navigation signals. FIG. 2 exemplarily illustrates this process.

The electronic control unit UCEe of the emitter E transmits signals S received by the electronic control unit UCEr of the receiver R.

Variable additional information items IAdd are transmitted on the navigation communication signals S with spectrum spreading. These additional information items IAdd are coded by a variation of a value of quantized intentional degradation DC of the correlation of the spreading code, the degradation DC extends coded on the spreading code by modifying at least one chip.

If the spreading code comprises N chips and the degradation tolerance equals x dB, it is possible to modify up to K chips out of each series of N chips, each series coding a respective symbol, and to transmit $2^K$ values for an additional item of information, with $x=-10.\log_{10}[(N-2K)/N]$, or stated otherwise $K=\frac{1}{2}N(1-10^{-(x/10)})$.

In normal operation of spread spectrum processing, the emitter and the receiver agree on a spreading code, which consists in replacing a 1 data bit by this spreading code and a 0 data bit by this complementary code.

For example, if the spreading code is defined 011010010101, the sequence of bits 1 0 0 1 will be coded by the succession of chips 011010010101 100101101010 100101101010 011010010101. A bit encoded with the spreading code is called a symbol and the unit brick of the spreading code (0 or 1 here) is called a chip.

At each symbol, the receiver effects the correlation between the signal received (registered in time and frequency) and the spreading code and will obtain for example +1 for the bits coding the 1 information item and −1 for the bits coding the 0 information item, thereby allowing it to demodulate the original message.

The principle of the present invention consists in coding information in the degradation of the correlations. A first simple way is to have the same tempo of supplementary information as the original spreading code. Each time the spreading code is repeated, some additional information is coded.

For example, with the previous element, the additional-information sequence 1 1 0 1 is coded by modifying a chip on each of the first two symbols, no chip on the third symbol and a chip again on the last symbol.

One of the aspects of interest of the invention is that the position of the modified chip does not matter. Still in this example, this gives for example the sequence of chips: 01101001011 100111101010 100101101010 010010101, or the sequence 010010010101 000101101010 100101101010 011010010111.

These two sequences code exactly the same additional information item, namely 1101.

The receiver R observes on the correlations a degradation of respectively 1/12th, 1/12th, 0, 1/12th i.e. in dB a degradation of 0.79 dB, 0.79 dB, 0.0 dB, 0.79 dB, and deduces therefrom the corresponding supplementary-information sequence 1 1 0 1.

Generalizing this example, if the spreading code comprises N chips and a tolerance of degradation of x dB, it is possible to modify up to K chips out of each series of N chips, each series coding a respective symbol, and to transmit $2^K$ values for an additional item of information, with $x=-10.\log_{10}[(N-2K)/N]$.

It is also possible to have a slower supplementary-information tempo than the tempo of the spreading code. It is then possible to distribute the degradation applied over several symbols (a repetition of the spreading code), thereby making it possible to minimize the degradation on each symbol while being able to maintain the demodulation of the additional information items.

For example, if we have a spreading code with a length of 30 chips, and we tolerate a degradation in it of 3 chips maximum (loss of 0.97 dB at worst) with respect to the nominal usage, then we can code an additional information item by degrading between 0 and 3 chips per symbol (not modifying any chip on a symbol is equivalent to coding the additional information item 0). If one observes that the precision of measurement of the correlation degradation at the level of the signal-to-noise reception ratio is such that the probability of being mistaken in the estimation on a supplementary-information chip in a symbol is 10% whilst one wants a probability of error of demodulation of the supplementary-information chips (equivalent of a binary error rate) of 1%, it is necessary to repeat the same degradation 10 times to make sure of obtaining this rate. Thus, to write the binary information sequence 3102, the degradations applied on the successive symbols are as follows: 3333333333111111111100000000002222222222.

The first 3 represents a symbol (the spreading code or its binary complement coding a bit of the message to be transmitted) i.e. 30 chips in which 3 chips have been modified. Thereafter, this degradation of 3 chips is repeated on the next 9 symbols so as to have 10 repetitions and we do likewise for the other supplementary information items to be coded. A binary message of 40 bits has therefore been used to encode this item of information.

The invention makes it necessary to have suitably adapted receivers, and in contradistinction to the prior art, a receiver which is not suitably adapted has enormous difficulty in identifying the additional information item since the latter is randomly distributed in the encoding of the original binary message.

Furthermore, it is noted that the degradations may be intermittent, and that they may be applied on a plurality of channels, for example on a data channel and a pilot channel. The benefit is to open up the possibility of multiplexing several independent supplementary information items, which may moreover have different rates of good detection, and therefore be suitable for different signal-to-noise ratios.

For example:
Two levels are defined: one where we code by steps of 15% of correlation degradation and one where we code by steps of 5% of correlation degradation. For the first level, one bit out of two is modified, alternating between the pilot channel and the data or code channel. For the second level, one bit out of four is modified on the data channel (and offset with respect to the first level). It is possible to code on the first level 15%, 30%, 0%, 45%, 30%, 15%, 0%, 15% (equivalent of 1, 2, 0, 3, 2) and 10% and 35% (equivalent of 2, 7, 8, 8) on the second level.

This gives (P=pilot channel, C=data channel):

The level 1 degradation is represented in bold and the level 2 degradation in underlined

| P (%) | 0  | 0  | 15 | 0      | 0  | 0  | 30 | 0  | 0      | 0      | 30 | 0  | 0  | 0      | 0  |
|-------|----|----|--------|--------|----|----|--------|----|--------|--------|--------|----|----|--------|--------|
| C (%) | 15 | <u>10</u> | 0 | 0 | 15 | <u>10</u> | 0 | 0 | 30 | <u>35</u> | 0 | 0 | 0 | <u>35</u> | 0 |

| P (%) | 0 | 0 | 0       | 45 | 0 | 0      | 0       | 45 | 0 | 0      | 0       | 30 | 0 | 0      | 0       | 15 |
|-------|---|---|---------|--------|---|--------|---------|--------|---|--------|---------|--------|---|--------|---------|--------|
| C (%) | 0 | 0 | <u>40</u> | 0 | 0 | 45 | <u>40</u> | 0 | 0 | 30 | <u>40</u> | 0 | 0 | 30 | <u>40</u> | 0 |

The table indicates for each code symbol (a column corresponds to a symbol) the correlation degradation percentage applied. In this example and these data, the pilot has been degraded by 5% (0.2 dB) and the code by 11% (0.5 dB).

The invention claimed is:

1. A method for transmitting additional information via one or more spread-spectrum signals, the method comprising:
   inverting, via a control unit, K chips of a spreading code, which comprises a natural number N of chips, K being another natural number;
   transmitting, via an emitter, the one or more spread-spectrum signals that include the K inverted chips, wherein up to $2^K$ values of the additional information are transmitted;
   correlating, via a receiver, the one or more spread-spectrum signals;
   determining a power degradation (x) of the correlation; and
   determining a number of chips that have been inverted based on $\frac{1}{2}*N*(1-10^{-(x/10)})$.

2. The method according to claim 1, wherein K chips of the spreading code are inverted a plurality of times for successive symbols, each of the symbols comprising N chips.

3. The method according to claim 2, wherein additional information is transmitted by inverting at least one different chip, among the N chips, of the successive symbols.

4. The method according to claim 1, wherein transmission of information items is performed while transmitting the K inverted chips that correspond with the additional information in an intermingled manner on a plurality of communication channels.

5. The method according to claim 4, wherein inversions are applied to one or more different chips of the spreading code, when a same message is transmitted on the channels.

6. The method according to claim 4, wherein the channels comprise a pilot channel and a data channel.

7. A system for transmitting additional information on communication or navigation signals with spectrum spreading, configured to implement the method according to claim 1.

* * * * *